US011834573B2

(12) United States Patent
Galizio

(10) Patent No.: US 11,834,573 B2
(45) Date of Patent: Dec. 5, 2023

(54) RESIN-EXTENDED RUBBER AND PROCESS FOR PREPARING

(71) Applicant: Bridgestone Americas Tire Operations, LLC, Nashville, TN (US)

(72) Inventor: Benjamin C. Galizio, Kent, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 17/409,284

(22) Filed: Aug. 23, 2021

(65) Prior Publication Data

US 2021/0380797 A1 Dec. 9, 2021

Related U.S. Application Data

(62) Division of application No. 16/086,154, filed as application No. PCT/US2017/023555 on Mar. 22, 2017, now Pat. No. 11,098,187.

(60) Provisional application No. 62/312,090, filed on Mar. 23, 2016.

(51) Int. Cl.
*C08L 47/00* (2006.01)

(52) U.S. Cl.
CPC .................................... *C08L 47/00* (2013.01)

(58) Field of Classification Search
CPC .. C08L 47/00; C08L 9/06; C08L 57/02; C08L 91/00; C08L 7/00; C08L 9/00; C08L 61/06
See application file for complete search history.

(56) References Cited

U.S. PATENT DOCUMENTS 2,744,125 A 5/1956 Meeks et al.
3,673,136 A 6/1972 Buchanan et al.
3,965,021 A * 6/1976 Clemens ............ G03G 9/08786 525/94
4,112,160 A * 9/1978 Kako ..................... C09J 109/02 525/138
4,290,470 A 9/1981 Williams et al.
4,539,365 A 9/1985 Rhee
4,578,411 A 3/1986 Budd et al.
4,808,657 A 2/1989 Brown
5,679,751 A 10/1997 Halasa et al.
5,959,039 A 8/1999 Yokoyama et al.
5,969,053 A 10/1999 Bauman et al.
7,045,578 B2 5/2006 Karato et al.
7,306,019 B2 12/2007 Kurokawa
7,371,791 B2 5/2008 Hattori et al.
7,569,639 B2 8/2009 Choi et al.
7,642,311 B2 1/2010 Shino
8,178,605 B2 5/2012 Lopitaux et al.
8,637,606 B2 1/2014 Pille-Wolf et al.
8,779,026 B2 7/2014 Lopitaux et al.
9,022,084 B2 5/2015 Zhao et al.
9,040,613 B2 5/2015 Opitaux et al.
9,108,464 B2 8/2015 Lopitaux et al.
9,132,699 B2 9/2015 Lopitaux et al.
11,098,187 B2 8/2021 Galizio
2003/0073765 A1* 4/2003 Ddamulire ......... C09J 123/0853 524/186
2003/0119964 A1* 6/2003 Bulluck ................... C08K 3/22 524/474
2004/0067380 A1 4/2004 Maeda et al.
2012/0029154 A1 2/2012 Deetz et al.
2012/0031537 A1* 2/2012 Izuchi ...................... C08K 3/04 152/526
2012/0157568 A1 6/2012 Sandstrom et al.
2013/0158185 A1 6/2013 Thompson
2013/0225701 A1 8/2013 Soice et al.
2013/0267640 A1* 10/2013 Lopez ................. C08K 5/0016 524/506
2013/0296471 A1 11/2013 Lesage et al.
2014/0155519 A1 6/2014 Ringot
2014/0235751 A1 8/2014 Lesage et al.
2014/0251519 A1 9/2014 Piffard et al.
2014/0326377 A1 11/2014 Abad et al.
2015/0259516 A1 9/2015 Mathey et al.
2016/0376426 A1 12/2016 Kimura
(Continued)

FOREIGN PATENT DOCUMENTS

CA 2057435 A1 6/1992
CN 104817740 A 8/2015
DE 4142367 A1 6/1992
(Continued)

OTHER PUBLICATIONS

"International Search Report and Written Opinion for PCT Application No. PCT/US2017/023555", dated Jul. 31, 2017, 14 Pages.
"Extended European Search Report and Search Opinion for European Patent Application No. 17771045.6", dated Oct. 23, 20191, 8 Pages.
"International Preliminary Report on Patentability and Written Opinion for PCT Application No. PCT/US2017/023555", dated Sep. 25, 2018, 9 Pages.
"Technical Data Sheet", Nevtac 115 Aliphatic Hydrocarbon Resin, Neville Chemical Company, Aug. 14, 2015, 1 Page.
"SP-6700 Resin", Document No. SCCF 4.2.3.2.A, Sovereign Chemical Company, Aug. 4, 2000, 2 Pages.
(Continued)

*Primary Examiner* — Mark S Kaucher
(74) *Attorney, Agent, or Firm* — Meredith E. Hooker; Nathan T. Lewis

(57) ABSTRACT

Disclosed herein are processes for preparing a resin-extended rubber by mixing at least one thermoplastic resin with a resin-rubber-solvent cement comprising at least one conjugated diene monomer-containing rubber and the resin-extended rubber resulting from such processes. Also disclosed is a resin-extended rubber-solvent-cement comprising at least one conjugated diene monomer-containing rubber, at least one non-polar solvent, and at least one thermoplastic resin as well as a rubber composition comprising a resin-extended rubber.

20 Claims, No Drawings

(56) References Cited

U.S. PATENT DOCUMENTS

| | | | |
|---|---|---|---|
| 2017/0190888 | A1 | 7/2017 | Pille-Wolf |
| 2020/0299501 | A1 | 9/2020 | Galizio |

FOREIGN PATENT DOCUMENTS

| | | | |
|---|---|---|---|
| EP | 0643117 | A1 | 3/1995 |
| EP | 2974884 | A1 | 1/2016 |
| GB | 624079 | A | 5/1949 |
| JP | 2004238547 | A | 8/2004 |
| JP | 2008115383 | A | 5/2008 |
| JP | 2010090293 | A | 4/2010 |
| JP | 2012087175 | A | 5/2012 |
| JP | 2012092173 | A | 5/2012 |
| JP | 2012162603 | A | 8/2012 |
| JP | 2019507233 | A | 3/2019 |
| WO | 2009062735 | A1 | 5/2009 |
| WO | 2010123015 | A1 | 10/2010 |
| WO | 2015079703 | A1 | 6/2015 |

OTHER PUBLICATIONS

Kopf, Peter W., "Phenolic Resins", In Encyclopedia of Polymer Science and Technology, vol. 7, Dec. 4, 2000, pp. 322-367.

"Non-Final Office Action for U.S. Appl. No. 16/086,154", dated Nov. 24, 2020, 13 Pages.

"Notice of Allowance and Fees Due for U.S. Appl. No. 16/086,154", dated Apr. 15, 2021, 8 Pages.

* cited by examiner

RESIN-EXTENDED RUBBER AND PROCESS FOR PREPARING

CROSS-REFERENCE TO RELATED APPLICATIONS

This application is a divisional of U.S. application Ser. No. 16/086,154, which was a national stage entry of PCT application No. PCT/US2017/023555, filed Mar. 22, 2017, which in turn claimed the benefit of provisional application No. 62/312,090, filed Mar. 23, 2016. These prior applications are incorporated herein by reference.

FIELD

The present application is directed to a resin-extended rubber, processes for preparing a resin-extended rubber and rubber compositions comprising resin-extended rubber.

BACKGROUND

The rubbers utilized in rubber compositions for tire components are either synthetic rubbers such as styrene-butadiene copolymer, high-cis polybutadiene and polyisoprene or non-synthetic rubbers such as Hevea natural rubber and non-Hevea natural rubber (e.g., guayule rubber). Synthetic rubbers in particular may be pre-mixed or extended with processing oils prior to being compounded with other ingredients to form a rubber composition. The oils used as extender oils are generally free-flowing liquids provided by processed or refined petroleum oils such as aromatic oil, naphthenic oil, TRAE oil, TDAE oil, and MES oil.

SUMMARY

Disclosed herein are a resin-extended rubber, processes for preparing a resin-extended rubber, a resin-extended rubber-solvent-cement, and rubber compositions comprising resin-extended rubber.

In a first embodiment, a process for preparing a resin-extended rubber is disclosed. The process comprises: (a) providing a rubber-solvent-cement comprising at least one conjugated diene monomer-containing rubber and at least one non-polar solvent, (b) mixing the rubber-solvent-cement with at least one thermoplastic resin to produce a resin-rubber-solvent-cement, and (c) producing a resin-extended rubber by removing the at least one non-polar solvent from the resin-rubber-solvent-cement, wherein the at least one thermoplastic resin of (b) is utilized in an amount of up 100 phr.

In a second embodiment, a process for preparing a resin-extended rubber is provided. The process comprises: (a) providing a rubber-solvent-cement comprising (i) at least one conjugated diene monomer-containing rubber comprising at least one of styrene-butadiene copolymer, polybutadiene, styrene-isoprene rubber, styrene-butadiene-isoprene rubber, natural rubber or polyisoprene, and (ii) at least one non-polar solvent comprising at least one of alkanes having from 4 to 9 carbon atoms, cycloalkanes and alkyl cycloalkanes having from 5 to 10 carbon atoms, or aromatics and alkyl substituted aromatics having from 6 to 12 carbon atoms; (b) mixing the rubber-solvent-cement with up to 100 phr of at least one thermoplastic resin comprising at least one of C5 resin, C9 resin, terpene resin, vinyl aromatic resin, terpene-phenolic resin, rosin resin, cyclopentadiene resin, guayule resin, or a combination thereof, to produce a resin-rubber-solvent-cement, and (c) producing a resin-extended rubber by removing the at least one non-polar solvent from the resin-rubber-solvent-cement.

In a third embodiment, a resin-extended rubber-solvent-cement is disclosed. The resin-extended rubber-solvent-cement comprises: 100 parts of at least one conjugated diene monomer-containing rubber, at least one non-polar solvent, and 5 to 100 phr of at least one thermoplastic resin.

In a fourth embodiment, a rubber composition is disclosed. The rubber composition comprises: (a) resin-extended rubber comprising n parts of rubber including at least one conjugated diene monomer-containing rubber and up to 100 phr of at least one thermoplastic resin, wherein n is an integer from 10 to 100; (b) optionally at least one additional rubber in an amount of 100−n parts; (c) at least one reinforcing filler in a total amount of 10-200 phr; and (d) a cure package.

DETAILED DESCRIPTION

Disclosed herein are a resin-extended rubber, processes for preparing a resin-extended rubber, a resin-extended rubber-solvent-cement, and a rubber composition comprising resin-extended rubber.

In a first embodiment, a process for preparing a resin-extended rubber is disclosed. The process comprises: (a) providing a rubber-solvent-cement comprising at least one conjugated diene monomer-containing rubber and at least one non-polar solvent, (b) mixing the rubber-solvent-cement with at least one thermoplastic resin to produce a resin-rubber-solvent-cement, and (c) producing a resin-extended rubber by removing the at least one non-polar solvent from the resin-rubber-solvent-cement, wherein the at least one thermoplastic resin of (b) is utilized in an amount of up 100 phr.

In a second embodiment, a process for preparing a resin-extended rubber is provided. The process comprises: (a) providing a rubber-solvent-cement comprising (i) at least one conjugated diene monomer-containing rubber comprising at least one of styrene-butadiene copolymer, polybutadiene, styrene-isoprene rubber, styrene-butadiene-isoprene rubber, natural rubber or polyisoprene, and (ii) at least one non-polar solvent comprising at least one of alkanes having from 4 to 9 carbon atoms, cycloalkanes and alkyl cycloalkanes having from 5 to 10 carbon atoms, or aromatics and alkyl substituted aromatics having from 6 to 12 carbon atoms; (b) mixing the rubber-solvent-cement with up to 100 phr of at least one thermoplastic resin comprising at least one of C5 resin, C9 resin, terpene resin, vinyl aromatic resin, terpene-phenolic resin, rosin resin, cyclopentadiene resin, guayule resin, or a combination thereof, to produce a resin-rubber-solvent-cement, and (c) producing a resin-extended rubber by removing the at least one non-polar solvent from the resin-rubber-solvent-cement.

In a third embodiment, a resin-extended rubber-solvent-cement is disclosed. The resin-extended rubber-solvent-cement comprises: 100 parts of at least one conjugated diene monomer-containing rubber, at least one non-polar solvent, and 5 to 100 phr of at least one thermoplastic resin.

In a fourth embodiment, a rubber composition is disclosed. The rubber composition comprises: (a) resin-extended rubber comprising n parts of rubber including at least one conjugated diene monomer-containing rubber and up to 100 phr of at least one thermoplastic resin, wherein n is an integer from 10 to 100; (b) optionally at least one additional rubber in an amount of 100−n parts; (c) at least one reinforcing filler in a total amount of 10-200 phr; and (d) a cure package.

Definitions

The terminology as set forth herein is for description of the embodiments only and should not be construed as limiting the invention as a whole.

As used herein the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, the term "phr" means parts per one hundred parts rubber. The 100 parts rubber refers to 100 parts of the at least one conjugated diene monomer-containing rubber.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein the term "thermoplastic" as in the phrase "thermoplastic resin" is used to indicate a resin which softens upon heating and can generally be molded in its softened state.

Resin-Extended Rubber

Disclosed herein is a resin-extended rubber. The resin-extended rubber may be made by a process according to the first embodiment disclosed herein, by a process according to the second embodiment disclosed herein, or may result from removing the at least one non-polar solvent from the resin-extended rubber-solvent-cement of the third embodiment. The resin-extended rubber comprises at least one conjugated diene monomer-containing rubber (discussed in more detail below) and up to 100 phr of at least one thermoplastic resin (also discussed in more detail below). In certain embodiments of the first-fourth embodiments disclosed herein, the resin-extended rubber comprises at least 5 phr, at least 10 phr, at least 15 phr, at least 20 phr, at least 25 phr, at least 30 phr or more thermoplastic resin, including 5 to 100 phr (e.g., 5, 10, 15, 20, 25, 30, 35, 37.5, 40, 45, 50, 55, 60, 65, 70, 75, 80, 85, 90, 95, and 100 phr), 10 to 80 phr, and 20 to 50 phr thermoplastic resin. When more than one thermoplastic resin is utilized to prepare the resin-extended rubber, the foregoing amounts can be understood to refer to the total amount of all thermoplastic resins in the resin-extended rubber. In those embodiments of the first-fourth embodiments wherein the at least one conjugated diene monomer-containing rubber has a relatively higher Mw (e.g., 500,000 grams/mole or above, such as discussed in more detail below) it can be advantageous to use the at least one thermoplastic resin in a relatively higher amount (e.g., 40 phr or more, such as discussed above) and/or to use a non-reinforcing thermoplastic resin. In those embodiments of the first-fourth embodiments wherein the at least one conjugated diene monomer-containing rubber has a relatively lower Mw (e.g., less than 500,000 or less than 400,000 grams/mole, such as discussed in more detail below), it can be advantageous to use the at least one thermoplastic resin in a relatively lower amount (e.g., less than 40 phr, such as discussed above).

The at least one conjugated diene monomer-containing rubber should be understood as a polymer comprising at least one conjugated diene monomer, optionally in combination with at least one vinyl aromatic monomer (thereby resulting in a copolymer). The at least one conjugated diene monomer can vary and exemplary such monomers are discussed below. Likewise, when present, the at least one vinyl aromatic monomer can vary and exemplary such monomers are discussed below. Generally as used herein, the term polymer should be understood to include homopolymers as well as copolymers.

Processes for Preparing a Resin-Extended Rubber

As discussed above, the first and second embodiments disclosed herein are directed to processes for preparing a resin-extended rubber. According to the first embodiment, a process for preparing a resin-extended rubber is disclosed. This process comprises: (a) providing a rubber-solvent-cement comprising at least one conjugated diene monomer-containing rubber and at least one non-polar solvent, (b) mixing the rubber-solvent-cement with at least one thermoplastic resin to produce a resin-rubber-solvent-cement, and (c) producing a resin-extended rubber by removing the at least one non-polar solvent from the resin-rubber-solvent-cement, wherein the at least one thermoplastic resin of (b) is utilized in an amount of up 100 phr. According to the second embodiment, a process for preparing a resin-extended rubber is provided. This process comprises: (a) providing a rubber-solvent-cement comprising (i) at least one conjugated diene monomer-containing rubber comprising at least one of styrene-butadiene copolymer, polybutadiene, styrene-isoprene rubber, styrene-butadiene-isoprene rubber, natural rubber or polyisoprene, and (ii) at least one non-polar solvent comprising at least one of: alkanes having from 4 to 9 carbon atoms, cycloalkanes and alkyl cycloalkanes having from 5 to 10 carbon atoms, or aromatics and alkyl substituted aromatics having from 6 to 12 carbon atoms; (b) mixing the rubber-solvent-cement with up to 100 phr of at least one thermoplastic resin comprising at least one of C5 resin, C9 resin, terpene resin, vinyl aromatic resin, terpene-phenolic resin, rosin resin, cyclopentadiene resin, guayule resin, or a combination thereof, to produce a resin-rubber-solvent-cement, and (c) producing a resin-extended rubber by removing the at least one non-polar solvent from the resin-rubber-solvent-cement. In certain embodiments of the first and second embodiments, the thermoplastic resin is pre-mixed with a portion of non-polar solvent(s) prior to the mixing of the rubber-solvent-cement with the resin; in such embodiments, the total amount of thermoplastic resin is as discussed herein (e.g., up to 100 phr). In certain embodiments of the first and second embodiments, the non-polar solvent(s) used in pre-mixing with the thermoplastic resin may be the same as the non-polar solvent(s) present in the rubber-solvent-cement. In other embodiments of the first and second embodiments, the non-polar solvent(s) used in pre-mixing with the thermoplastic resin is different from the non-polar solvent(s) present in the rubber-solvent-cement.

Rubber-Solvent-Cement

As discussed above, the processes of both the first embodiment and the second embodiment include providing a rubber-solvent-cement. According to the process of the first embodiment, the rubber-solvent-cement comprises at least one conjugated diene monomer-containing rubber and at least one non-polar solvent. According to the process of the second embodiment, the rubber-solvent-cement comprises (i) at least one conjugated diene monomer-containing rubber comprising at least one of styrene-butadiene copolymer, polybutadiene, styrene-isoprene rubber, styrene-butadiene-isoprene rubber, natural rubber or polyisoprene, and (ii) at least one non-polar solvent comprising at least one of alkanes having from 4 to 9 carbon atoms, cycloalkanes and alkyl cycloalkanes having from 5 to 10 carbon atoms, or aromatics and alkyl substituted aromatics having from 6 to 12 carbon atoms. In certain embodiments of the first and second embodiments, the rubber-solvent-cement is entirely comprised of (i.e., 100% of its weight consists of) the at least one conjugated diene monomer-containing rubber and the at least one non-polar solvent. In other embodiments of the first and second embodiments, the rubber-solvent-cement comprises at least 90%, at least 95%, at least 98%, or at least 99% by weight of the at least one conjugated diene monomer-containing rubber and the at least one non-polar solvent; in certain such embodiments ingredients such as antioxidants may comprise the remainder. According to first and second embodiments, the rubber-solvent-cement can be understood as resulting from solution polymerization of at least one conjugated diene monomer (for synthetic rubbers such as styrene-butadiene, polybutadiene and polyisoprene) and as a solvent-solubilized form of a natural rubber. As those of skill in the art will understand, solution polymerization of synthetic rubbers generally comprises the use of a solvent (e.g., at least one non-polar solvent) in a process wherein the other components (e.g., monomer(s) and catalyst and optionally a modifier such as a vinyl bond content modifier) are dissolved in the solvent and polymerization to produce the polymer or copolymer takes place in the solvent. The solution of the polymer or copolymer in the solvent is generally referred to as a cement and since it contains rubber and solvent, it is referred to herein as a "rubber-solvent-cement." Exemplary polymerization methods for producing the rubber-solvent-cement include, but are not limited to, those employing Ziegler-Natta catalyst systems (e.g., based on transition metals which include lanthanides such as neodymium, nickel catalysts or titanium-based catalysts) as well as those employing anionic polymerization with organometallic catalysts (e.g., hydrocarbyl lithium, hydrocarbyl sodium, hydrocarbyl potassium, or hydrocarbyl magnesium). Generally, the rubber-solvent-cement will be processed to produce a solid conjugated diene monomer-containing rubber prior to that rubber being incorporated (compounded) into a rubber composition with other ingredients such as filler(s), processing aids, and a cure package. In other words, the at least one non-polar solvent is removed from the rubber-solvent-cement. When the polymerization process has proceeded sufficiently or has been stopped (such as by the use of a terminating agent or a coupling agent), the resulting polymer or copolymer can be recovered from the cement by utilizing conventional procedures of desolventization and drying. For instance, the polymer or copolymer may be isolated from the solution by coagulation (or precipitation) with an alcohol (e.g., a C1-C4 alcohol such as methanol, ethanol, isopropanol, n-propanol, t-butyl alcohol), followed by isolation; by steam distillation of the solvent and the unreacted monomer, followed by isolation; by filtration of the coagulated polymer; or by centrifugation of the coagulated polymer. Preferably, the isolated polymer is then dried to remove residual amounts of solvent and water. Alternatively, the polymer may be isolated from the polymerization mixture by evaporating the solvent, such as by directly drum drying the cement. In certain embodiments of the first embodiment, the removing of the at least one non-polar solvent from the rubber-solvent-cement comprises at least one of: steam distillation, filtration, centrifugation, or drum drying. According to the processes of the first and second embodiments disclosed herein, the at least one thermoplastic resin is added to the rubber-solvent-cement prior to removing the solvent, thereby producing a resin-rubber-solvent-cement that can be subsequently processed (as described above) to remove the at least one non-polar solvent. Once the at least one non-polar solvent has been removed from the resin-rubber-solvent-cement, the resin-extended rubber that is produced can be described as a solid rubber.

Conjugated Diene Monomer-Containing Rubber

As discussed above, the processes of the first and second embodiments disclosed herein as well as the resin-extended rubber-solvent-cement of the third embodiment and the rubber composition of the fourth embodiment include at least one conjugated diene monomer-containing rubber. According to the first-fourth embodiments, one or more than one conjugated diene monomer-containing rubber can be utilized. The at least one conjugated diene monomer-containing rubber should be understood as a polymer comprising at least one conjugated diene monomer, optionally in combination with at least one vinyl aromatic monomer (thereby resulting in a copolymer).

As those of skill in the art will understand, a conjugated diene monomer is a compound that has two double carbon-carbon bonds (i.e., two —C═C— bonds) that are separated by a single bond (i.e., —C—C—); a conjugated diene will contain at least one —C═C—C═C— moiety. The particular structure of the conjugated diene monomer used to prepare the at least one conjugated diene monomer-containing rubber of the first-fourth embodiments disclosed herein can vary. Non-limiting examples of suitable conjugated diene monomers according to certain embodiments of the first-fourth embodiments disclosed herein include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated dienes may be utilized in certain embodiments of the first-fourth embodiments. In certain embodiments of the first-fourth embodiments, the conjugated diene monomer comprises 1,3-butadiene, isoprene, or a combination thereof. In certain embodiments of the first-fourth embodiments, the conjugated diene monomer comprises 1,3-butadiene.

As mentioned above, the at least one conjugated diene monomer-containing rubber may be a copolymer comprising at least one conjugated diene monomer in combination with at least one vinyl aromatic monomer. In certain embodiments of the first-fourth embodiments disclosed herein, the at least one vinyl aromatic monomer comprises at least one of styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the first-fourth embodiments disclosed herein, the at least one vinyl aromatic monomer comprises styrene. In certain embodiments of the first-fourth embodiments disclosed herein, the at least one conjugated diene monomer comprises 1,3-butadiene and the at least one vinyl aromatic monomer comprises styrene.

The at least one conjugated diene monomer-containing polymer rubber contained within the rubber-solvent-cement of the first-fourth embodiments may be prepared (polymerized) and recovered according to various suitable methods such as batch, semi-continuous, or continuous operations, as are well known to those having skill in the art. The polymerization can also be carried out in a number of different polymerization reactor systems, including but not limited to bulk polymerization, solution polymerization, suspension polymerization, and coordination polymerization. The polymerization may be carried out using a free radical mechanism, an anionic mechanism, a cationic mechanism, or a coordination mechanism. All of the above polymerization methods are well known to persons skilled in the art. However, for exemplary purposes, a short description of polymerization via an anionic mechanism is given.

When rubbers, such as a conjugated diene monomer-containing polymer or copolymer rubbers, are produced through anionic polymerization, an organic alkaline metal compound, preferably a lithium-containing compound, is typically used as a polymerization initiator. Examples of lithium-containing compounds used as polymerization initiators include, but are not limited to, hydrocarbyl lithium compounds, lithium amide compounds, and similar lithium compounds. The amount of the lithium compound used as the polymerization initiator is preferably within a range of 0.2 to 20 millimoles per 100 g of the monomer.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

Methods for producing rubbers, such as conjugated diene-monomer-containing polymer or copolymer rubbers, through anionic polymerization using an organic alkaline metal compound as the polymerization initiator are not particularly limited. For example, a conjugated diene monomer-containing polymer or copolymer rubber can be produced by polymerizing a conjugated diene monomer alone or a mixture of a conjugated diene monomer and aromatic vinyl compound in a hydrocarbon solvent inactive to the polymerization reaction. Non-limiting examples of the hydrocarbon solvent inactive to the polymerization reaction include propane, n-butane, isobutane, n-pentane, isopentane, hexanes (e.g., n-hexane, cyclohexane), propene, 1-butene, isobutene, trans-2-butene, cis-2-butene, 1-pentene, 2-pentene, 1-hexene, 2-hexene, benzene, toluene, xylene, ethylbenzene and mixtures thereof.

In certain embodiments of the first-fourth embodiments, the at least one conjugated diene monomer-containing rubber may have been produced by an anionic polymerization process that utilizes a randomizer. The randomizer can control the microstructure of the conjugated diene compound, and has an action such that the 1,2-bond content in butadiene unit of the polymer using, for example, butadiene as a monomer is controlled, and butadiene unit and styrene unit in the copolymer using butadiene and styrene as a monomer are randomized, or the like. Non-limiting examples of suitable randomizers include dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalents per 1 mole of the organic alkaline metal compound as a polymerization initiator.

In certain embodiments of the first-fourth embodiments disclosed herein, the at least one conjugated diene monomer-containing rubber has been coupled. As mentioned above, coupling can be employed as a method to terminate the polymerization reaction once a desired conversion (e.g., number of mers, Mw or Mn) is achieved. Alternatively, according to certain embodiments of the first-fourth embodiments, the polymerization reaction can be stopped by terminating. One manner of terminating a polymerization is by protonating the living polymer by adding a compound that can donate a proton to the living end. Non-limiting examples include water, isopropyl alcohol, and methyl alcohol, and any mixtures thereof.

In certain embodiments of the first-fourth embodiments, a functionalized and coupled form of the conjugated diene monomer-containing rubber can be utilized, such an effect can be achieved by treating the living polymer with both coupling and functionalizing agents, which serve to couple some chains and functionalize other chains. The combination of coupling agent and functionalizing agent can be used at various molar ratios. Although the terms coupling and functionalizing agents have been employed in this specification, those skilled in the art appreciate that certain compounds may serve both functions. That is, certain compounds may both couple and provide the polymer chains with a functional group. Those skilled in the art also appreciate that the ability to couple polymer chains may depend upon the amount of coupling agent reacted with the polymer chains. For example, advantageous coupling may be achieved where the coupling agent is added in a one to one ratio between the equivalents of lithium on the initiator and equivalents of leaving groups (e.g., halogen atoms) on the coupling agent. Non-limiting examples of coupling agents include metal halides, metalloid halides, alkoxysilanes, and alkoxystannanes.

In one or more embodiments, metal halides or metalloid halides may be selected from the group comprising compounds expressed by the formula (1) $R^*_n M^1 Y_{(4-n)}$, the formula (2) $M^1 Y_4$, and the formula (3) $M^2 Y_3$, where each R* is independently a monovalent organic group having 1 to 20 carbon atoms, $M^1$ is a tin atom, silicon atom, or germanium atom, $M^2$ is a phosphorous atom, Y is a halogen atom, and n is an integer of 0-3.

Exemplary compounds expressed by the formula (1) include halogenated organic metal compounds, and the compounds expressed by the formulas (2) and (3) include halogenated metal compounds.

In the case where $M^1$ represents a tin atom, the compounds expressed by the formula (1) can be, for example, triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by formula (2).

In the case where M' represents a silicon atom, the compounds expressed by the formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the formula (2). In the case where M' represents a germanium atom, the compounds expressed by the formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the formula (2). Phosphorous trichloride, phosphorous tribromide and the like can be exemplified as the compounds expressed by the formula (3). In one or more embodiments, mixtures of metal halides and/or metalloid halides can be used.

In one or more embodiments, alkoxysilanes or alkoxystannanes may be selected from the group comprising compounds expressed by the formula (4) $R^*_n M^1(OR^\wedge)_{4-n}$, where each R* is independently a monovalent organic group having 1 to 20 carbon atoms, $M^1$ is a tin atom, silicon atom, or germanium atom, $OR^\wedge$ is an alkoxy group where $R^\wedge$ is a monovalent organic group, and n is an integer of 0-3.

Exemplary compounds expressed by the formula (4) include tetraethyl orthosilicate, tetramethyl orthosilicate, tetrapropyl orthosilicate, tetraethoxy tin, tetramethoxy tin, and tetrapropoxy tin.

In certain embodiments of the first-fourth embodiments disclosed herein, the at least one conjugated diene monomer-containing rubber comprises a functionalized polymer (or copolymer) which is functionalized at least one of its head, its tail, or along its backbone. In certain embodiments according to the first-fourth embodiments disclosed herein, the functionalized polymer (or copolymer) comprises a polymer (or copolymer) with a silica-reactive functional group, a nitrogen-containing functional group, an oxygen-containing functional group, a sulfur-containing functional group, or a combination of the foregoing. Non-limiting examples of silica-reactive functional groups that are known to be utilized in functionalizing conjugated diene polymers and copolymers and are suitable for use in the rubber compositions of certain embodiments of the first-fourth embodiments disclosed herein include nitrogen-containing functional groups, silicon-containing functional groups, oxygen or sulfur-containing functional groups, and metal-containing functional groups. As used herein, the term functionalized polymer should be understood to include polymers (including conjugated diene monomer-containing polymer or copolymer rubbers) with a functional group at one or both terminus (e.g., from use of a functionalized initiator, a functionalized terminator, or both), a functional group in the main chain of the polymer (e.g., along the backbone), and combinations thereof. For example, a silica-reactive functionalized polymer may have the functional group at one or both terminus, in the main chain thereof, or both in the main chain and at one or both terminus.

Non-limiting examples of nitrogen-containing functional groups that are known to be utilized in functionalizing rubbers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments of the first-fourth embodiments disclosed herein, the at least one conjugated diene monomer-containing rubber comprises a functionalized conjugated diene monomer-containing polymer or copolymer rubber having at least one nitrogen-containing functional group selected from the foregoing list.

Non-limiting examples of silicon-containing functional groups that are known to be utilized in functionalizing rubbers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing rubbers also include those disclosed in U.S. Pat. No. 6,369,167, the entire disclosure of which is hereby incorporated by reference. In certain embodiments of the first-fourth embodiments disclosed herein, the at least one conjugated diene monomer-containing rubber comprises a functionalized rubber having at least one silicon-containing functional group selected from the foregoing list.

Non-limiting examples of oxygen or sulfur-containing functional groups that are known to be utilized in functionalizing rubbers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. In certain embodiments, the foregoing alkoxy group may be an alcohol-derived alkoxy group derived from a benzophenone. In certain embodiments according to the first-fourth embodiments disclosed herein, the at least one conjugated diene monomer-containing rubber comprises a functionalized conjugated diene monomer-containing polymer or copolymer rubber having at least one oxygen and/or sulfur-containing functional group selected from the foregoing list.

The molecular weight of the at least one conjugated diene monomer-containing rubber utilized in the first-fourth embodiments may vary. In certain embodiments of the first-fourth embodiments, the at least one conjugated diene monomer-containing rubber has a Mw (as determined by gel permeation chromatography ("GPC")) of 500,000 to 2,000,000 grams/mole (e.g., 500,000; 600,000; 700,000; 800,000; 900,000; 1.1 million; 1.2 million; 1.3 million; 1.4 million; 1.5 million; 1.6 million; 1.7 million; 1.8 million; 1.9 million; 2 million grams/mole). In certain embodiments of the first-fourth embodiments, the at least one conjugated diene monomer-containing rubber comprises a synthetic rubber (e.g., styrene-butadiene copolymer, polybutadiene, or polyisoprene) having a Mw of 500,000 to 1,500,000 grams/mole (e.g., 500,000; 600,000; 700,000; 800,000; 900,000; 1.1 million; 1.2 million; 1.3 million; 1.4 million; 1.5 million grams/mole); 500,000 to 1,250,000 grams/mole, or 500,000 to 1,250,000 grams/mole. In certain embodiments of the first-fourth embodiments, the at least one conjugated diene monomer-containing rubber has a Mw (as determined by gel permeation chromatography ("GPC")) of 200,000 to 1,000,000 grams/mole (e.g., 200,000; 250,000; 300,000; 400,000; 500,000; 600,000; 700,000; 800,000; 900,000; 1 million grams/mole). In certain embodiments of the first-fourth embodiments, the at least one conjugated diene monomer-containing rubber comprises a synthetic rubber (e.g., styrene-butadiene copolymer, polybutadiene, or polyisoprene) having a Mw of 200,000 to 750,000 grams/mole (e.g., 200,000; 250,000; 300,000; 400,000; 500,000; 600,000;

700,000; 750,000 grams/mole); 200,000 to 600,000 grams/mole, or 200,000 to 500,000 grams/mole. In certain embodiments of the first-fourth embodiments, the at least one conjugated diene monomer-containing rubber consists of (or is limited to) a synthetic rubber (e.g., styrene-butadiene copolymer, polybutadiene, or polyisoprene), optionally having a Mw within one of the foregoing ranges. In certain embodiments of the first-fourth embodiments, the at least one conjugated diene monomer-containing rubber comprises a non-synthetic rubber (e.g., Hevea natural rubber or a non-Hevea natural rubber such as guayule natural rubber) having a Mw of 1,000,000 to 2,000,000 grams/mole (e.g., 1 million, 1.1 million, 1.2 million, 1.3 million, 1.4 million, 1.5 million, 1.6 million, 1.7 million, 1.8 million, 1.9 million, 2 million grams/mole); 1,250,000 to 2,000,000 grams/mole, or 1,500,000 to 2,000,000 grams/mole. In certain embodiments of the first-fourth embodiments, the at least one conjugated diene monomer-containing rubber consists of (or is limited to) a non-synthetic rubber (e.g., Hevea natural rubber or a non-Hevea natural rubber such as guayule natural rubber), optionally having a Mw within one of the foregoing ranges. In certain embodiments of the first-fourth embodiments, the at least one conjugated diene monomer-containing rubber has a number average molecular weight (Mn) of 80,000 to 1,000,000, preferably 100,000 to 500,000 grams/mole (as determined by gel permeation chromatography ("GPC")). The GPC measurements referred to herein can be determined utilizing calibration with polystyrene standards and the relevant Mark-Houwink constants.

As those of skill in the art will appreciate a conjugated diene monomer-containing rubber having a higher Mw will generally have a higher Mooney viscosity. In certain embodiments of the first-fourth embodiments, the resin-extended form of the rubber will have a lower Mooney viscosity than a non-resin-extended version of the same rubber. A determination of the Mooney viscosity of the non-resin-extended version of a given rubber can be made by taking a sample of the rubber-solvent-cement prior to addition of the at least one thermoplastic resin and removing the at least one non-polar solvent thereform to produce a solid rubber whose Mooney viscosity can be measured. In certain embodiments of the first-fourth embodiments, the at least one conjugated diene monomer-containing rubber has a non-resin-extended Mooney viscosity of 100 or greater, including 100 to 200 (e.g., 100, 105, 110, 115, 120, 125, 130, 135, 140, 145, 150, 155, 160, 165, 170, 175, 180, 185, 190, 195, 200), 100 to 190, 100 to 180, 100 to 170, 100 to 160, 100 to 150, 110 to 200, 110 to 190, 110 to 180, 110 to 170, 110 to 160, 110 to 150, 120 to 200, 120 to 190, 120 to 180, 120 to 170, 120 to 160, and 120 to 150; in certain such embodiments, the Mooney viscosity of the resin-extended form of the at least one conjugated diene monomer-containing rubber is lower than the Mooney viscosity of the non-resin-extended form of the same polymer. In other embodiments of the first-fourth embodiments, the at least one conjugated diene monomer-containing rubber has a non-resin-extended Mooney viscosity of less than 100, including about 50 to less than 100, 50 to less than 100 (e.g., 50, 55, 60, 65, 70, 75, 80, 85, 90, 95, 97, 98, 99). In certain embodiments of the first-fourth embodiments, the at least one conjugated diene monomer-containing rubber in its resin-extended form (i.e., the resin-extended rubber) has a Mooney viscosity of less than 100, including 20 up to less than 100 (e.g., 20, 25, 30, 35, 40, 45, 50, 55, 60, 65, 70, 75, 80, 85, 90, 95, 98, 99), 30 up to 100, 30 up to 95, 30 up to 90, 30 up to 85, 30 up to 80, 35 up to 100, 35 up to 95, 35 up to 90, 35 up to 85, 35 up to 80, 40 up to 100, 40 up to 95, 40 up to 90, 40 up to 85, 40 up to 80, 45 up to 100, 45 up to 95, 45 up to 90, 45 up to 85, 45 up to 80, 50 up to 95, 50 up to 90, 50 up to 85, 50 up to 80, 55 up to less than 100, 55 up to 95, 55 up to 90, 55 up to 85, 55 up to 80, 60 up to less than 100, 60 up to 95, 60 up to 90, 60 up to 85, and 60 up to 80. The Mooney viscosities referred to herein can be determined at 130° C. using an Alpha Technologies Mooney viscometer with a large rotor, a one minute warm-up time, and a four minute running time, and, can be referred to as Mooney1+4 or ML1+4.

In certain embodiments of the first-fourth embodiments disclosed herein, the at least one conjugated diene monomer-containing rubber comprises at least one of the following rubbers: polyisoprene rubber, natural rubber, styrene-butadiene rubber, styrene-isoprene rubber, butadiene-isoprene-rubber, styrene-isoprene-butadiene rubber, polybutadiene, butyl rubber (both halogenated and non-halogenated), neoprene (polychloroprene), ethylene-propylene rubber, and ethylene-propylene-diene rubber (EPDM). In certain embodiments of the first-fourth embodiments disclosed herein, the at least one conjugated diene monomer-containing rubber comprises at least one of: styrene-butadiene rubber, polybutadiene, styrene-isoprene rubber, styrene-butadiene-isoprene rubber, natural rubber, or polyisoprene. In certain embodiments of the first-fourth embodiments, the at least one conjugated diene rubber comprises at least one of: styrene-butadiene rubber, polybutadiene, natural rubber, or polyisoprene. In certain embodiments of the first-fourth embodiments, any polybutadiene utilized is preferably a high-cis polybutadiene, having a cis 1,4-bond content of at least 85%, even more preferably at least 90%, or even at least 95% or at least 98%.

Non-Polar Solvent

As discussed above, the processes of the first and second embodiments disclosed herein as well as the resin-extended rubber-solvent-cement of the third embodiment include at least one non-polar solvent. According to the first-fourth embodiments, one or more than one non-polar solvent can be utilized. In certain embodiments of the first-fourth embodiments, the rubber-solvent-cement includes solvents that are limited to non-polar solvents (i.e., no polar solvents are contained within the rubber-solvent-cement) so as to avoid early coagulation of the rubber from the cement. As discussed above, once the resin-extended rubber-solvent-cement has been produced, a polar solvent (such as an alcohol) may be added to facilitate coagulation of the resin-extended rubber from the cement.

The at least one non-polar solvent contained within the rubber-solvent-cement can vary. In certain embodiments of the first-fourth embodiments, the at least one non-polar solvent contained within the rubber-solvent-cement is selected from at least one of: alkanes having from 4 to 9 carbon atoms, cycloalkanes or alkyl cycloalkanes having from 5 to 10 carbon atoms, or aromatics and alkyl substituted aromatics having from 6 to 12 carbon atoms. In certain embodiments of the first-fourth embodiments, the at least one non-polar solvent contained within the rubber-solvent-cement comprises an alkane having 4 to 9 carbon atoms and selected from at least one of: pentane, hexane, heptane, or nonane. In certain embodiments of the first-fourth embodiments, the at least one non-polar solvent contained within the rubber-solvent-cement comprises a cycloalkane having from 5 to 10 carbon atoms and selected from at least one of: cyclohexane or cyclopentane. In certain embodiments of the first-fourth embodiments, the at least one non-polar solvent contained within the rubber-solvent-cement comprises an aromatic or alkyl substituted aromatic having from 6 to 12 carbon atoms and selected from at least one of: benzene, toluene, or xylene. In certain embodiments of the first-fourth embodiments, the at least one non-polar solvent contained within the rubber-solvent-cement comprises at least one of: pentane, hexane, heptane, nonane, iso-hexane, n-hexane, cyclohexane, cyclopentane, benzene, toluene, or xylene. In certain embodiments of the first-fourth embodiments, the at least one non-polar solvent contained within the rubber-solvent-cement comprises hexane. In certain embodiments of the first-fourth embodiments, the at least one non-polar solvent contained within the rubber-solvent-cement comprises iso-hexane. In certain embodiments of the first-fourth embodiments, the at least one non-polar solvent contained within the rubber-solvent-cement comprises cyclohexane. In certain embodiments of the first-fourth embodiments, the rubber-solvent-cement contains less than 5% by weight, less than 1% by weight, less than 0.5% by weight or 0% by weight water.

Thermoplastic Resin

As discussed above, the processes of the first and second embodiments disclosed herein as well as the resin-extended rubber-solvent-cement of the third embodiment, and the rubber composition of the fourth embodiment includes at least one thermoplastic resin. As mentioned above, by describing the resin as a thermoplastic resin, it is intended to indicate that the resin will soften upon heating (e.g., above room temperature) and can generally be molded in the softened state. As a non-limiting example, resins such as epoxies and polyurethanes which are cured to form non-softenable compounds would not be considered to be a thermoplastic resin. According to the first-fourth embodiments, one or more than one thermoplastic resin can be utilized. As discussed in more detail below, various types of thermoplastic resins can be considered suitable for use in the first-fourth embodiments disclosed herein, including petroleum-sourced thermoplastic resins, plant-sourced thermoplastic resins, and synthetic thermoplastic resins.

As discussed above, the amount of thermoplastic resin used in the processes of the first and second embodiments and in the third and fourth embodiments can generally be measured in terms of parts per 100 parts (or 100 phr) of the at least one conjugated diene monomer-containing rubber. According to the first-fourth embodiments, the at least one thermoplastic resin is present in an amount of up to 100 phr (i.e., up to 100 parts thermoplastic resin per 100 parts (total) of at least one conjugated diene monomer-containing rubber). In certain embodiments of the first-fourth embodiments, the resin-extended rubber comprises at least 5 phr, at least 10 phr, at least 15 phr, at least 20 phr, at least 25 phr, at least 30 phr or more thermoplastic resin, including 5 to 100 phr (e.g., 5, 10, 15, 20, 25, 30, 35, 37.5, 40, 45, 50, 55, 60, 65, 70, 75, 80, 85, 90, 95, and 100 phr), 10 to 80 phr, and 20 to 50 phr thermoplastic resin. When more than one thermoplastic resin is utilized to prepare the resin-extended rubber, the foregoing amounts can be understood to refer to the total amount of all thermoplastic resins.

In certain embodiments of the first-fourth embodiments, the at least one thermoplastic resin has a Tg (glass transition temperature) above room temperature (25° C.), above 0° C., above 10° C., above 20° C., above 25° C., above 30° C.; in certain such embodiments, the Tg of the at least one thermoplastic resin is above one of the foregoing temperature but no more than 150° C. or no more than 100° C. In certain embodiments of the first-fourth embodiments, the at least one thermoplastic resin has a Mn (number average molecular weight) of 400 to 5000 grams/mole (e.g., 400, 500, 750, 1000, 1250, 1500, 1750, 2000, 2250, 2500, 2750, 3000, 3250, 3500, 3750, 4000, 4250, 4500, 4750, or 5000 grams/mole), including 500 to 5000 grams/mole, 400 to 4500 grams/mole, 500 to 4500 grams/mole, 400 to 4000 grams/mole, 500 to 4000 grams/mole, 400 to 3500 grams/mole, 500 to 3500 grams/mole, 400 to 3000 grams/mole, 500 to 3000 grams/mole, 400 to 2500 grams/mole, 500 to 2500 grams/mole, 400 to 2000 grams/mole, 500 to 2000 grams/mole, 400 to 1500 grams/mole, 500 to 1500 grams/mole, 400 to 1200 grams/mole, and 500 to 1200 grams/mole; the foregoing Mn values are based upon a polystyrene standard and can be determined by gel permeation chromatography ("GPC") or another chromatographic method such as size exclusion chromatography ("SEC") using an apparatus from Waters Alliance under the following conditions: elution solvent: tetrahydrofuran, temperature: 35° C., concentration: 1 gram/liter, flow rate: 1 milliliter/minute, volume injected: 100 microliters, Moore calibration with polystyrene standards, 3 columns in series: Styragel HR4E, Stryragel HR1 and Styragel HR 0.5, detection by: differential refractometer such as Waters 2410. In certain embodiments of the first-fourth embodiments, the at least one thermoplastic resin has a softening point (measured according to ISO Standard 4625 by the Ring and Ball method) of at least 10° C., at least 20° C., at least 25° C., at least 30° C., at least 40° C., at least 50° C., at least 60° C., at least 70° C. or higher. In certain embodiments of the first-fourth embodiments, the at least one thermoplastic resin is a solid at room temperature (25° C.). As used herein, the term solid refers to a non-pourable substance. A non-pourable substance that may slowly flow (but is not pourable) should still be considered to be a solid. In certain embodiments of the first-fourth embodiments, the at least one thermoplastic resin meets at least one of: the foregoing Tg numbers or ranges, the foregoing Mn numbers or ranges, or the foregoing solid at room temperature requirement. In certain embodiments of the first-fourth embodiments, the at least one thermoplastic resin meets at least one of the following: has an Mn of 400 to 2000 grams/mole, is a solid at 25° C., or has a Tg of at least 25° C.

In certain embodiments of the first-fourth embodiments, the at least one thermoplastic resin comprises a reinforcing thermoplastic resin. In certain embodiments of the first-fourth embodiments, the at least one thermoplastic resin is limited to one or more reinforcing thermoplastic resins; in other words, no non-reinforcing thermoplastic resin is utilized. In other embodiments of the first-fourth embodiments, the at least one thermoplastic resin comprises a non-reinforcing thermoplastic resin. In certain embodiments of the first-fourth embodiments, the at least one thermoplastic resin is limited to one or more non-reinforcing thermoplastic resins; in other words, no reinforcing thermoplastic resin is used. In yet other embodiments, the at least one thermoplastic resin comprises a mixture of at least one reinforcing thermoplastic resin and at least one non-reinforcing thermoplastic resin. As used herein, the phrase "reinforcing thermoplastic resin" refers to a thermoplastic resin which can participate in crosslinking of the rubber composition and, thus, acts to reinforce the rubber composition. A non-reinforcing thermoplastic can also be described as a non-reactive thermoplastic resin in that does not participate in crosslinking of the rubber composition.

Non-limiting examples of reinforcing thermoplastic resins suitable for use in certain embodiments of the first-fourth embodiments include phenolic resins such as phenol novolak resins, phenol-formaldehyde resins, resorcinol-formaldehyde resins, reactive resol resins (which can react with unsaturation in an elastomer or rubber to contribute to crosslinking), and reactive novolak type phenol-formaldehyde resins (which can crosslink with methylene donors). As used herein, the term phenol or phenolic should be understood to include phenol, alkylated phenols, phenols from natural sources such as cashew nut oil, and resorcinol. In certain embodiments of the first-fourth embodiments disclosed herein, when the at least one thermoplastic resin comprises a reinforcing thermoplastic resin, a methylene donor compound is also used. In those embodiments of the first-fourth embodiment wherein a methylene donor compound is used, it may be added at various stages such as with the reinforcing thermoplastic resin by mixing into the rubber-solvent-cement (e.g., in a separate steam but at the same stage, in a pre-mixed single stream, after the reinforcing thermoplastic resin but prior to isolating the polymer by removing the solvent), or after isolating the polymer by removing the solvent (e.g., during compounding optionally with other ingredients such as fillers). The term “methylene acceptor” is known to those having skill in such art and is used to describe the reactant(s), or compound(s) with which a methylene donor compound reacts to form what is believed to be an intermediate methylol monomer. It is envisioned that a condensation of the intermediate methylol monomer by formation of a methylene bridge produces a resin material. The initial reactant for which it is envisioned contributes the moiety that later forms the methylene bridge and ultimately the resin is referred to as the methylene donor and the other reactant is referred to as the methylene acceptor. Phenols can act as methylene acceptors. Examples of methylene donor compounds include, but are not limited to, hexamethoxymethylmelamine, hexamethylenetetramine, methoxymethyl melamine, N,N'N"-trimethyl N,N'N"-trimethylolmelamine, hexamethylomelamine, N,N'N"-dimethylolmelamine, N-methylolmelamine, N,N'-dimethylolmelamine, N,N'N"-tris(methoxymethyl)melamine, N,N'N"-tributyl-N,N'N"-trimethyloi-melamine, hexaethoxymethylmelamine, and mixtures thereof.

In certain embodiments of the first-fourth embodiments, the at least one thermoplastic resin comprises at least one of a/an: aliphatic resin, cycloaliphatic resin, aromatic resin, hydrogenated aromatic resin, terpene resin, or aliphatic/aromatic resin. The foregoing resins can be understood as non-reinforcing thermoplastic resins. According to the first-fourth embodiments, the at least one thermoplastic resin can be a combination of the foregoing types of resins (e.g., an aliphatic-aromatic resin contains both an aliphatic and an aromatic component) and, thus, a particular resin may be considered to fall within more than one category.

In certain embodiments of the first-fourth embodiments, the at least one thermoplastic resin comprises an aliphatic resin, optionally in combination with one or more of the foregoing resins (e.g., cycloaliphatic, aromatic, hydrogenated aromatic, terpene) and/or optionally partially or fully hydrogenated. Non-limiting examples of aliphatic resins suitable for use as the at least one thermoplastic resin in certain embodiments of the first-fourth embodiments include C5 fraction homopolymer or copolymer resins. Non-limiting examples of aliphatic copolymer resins include C5 fraction/C9 fraction copolymer resins, C5 fraction/vinylaromatic copolymer resins (e.g., C5 fraction/styrene copolymer resin). In certain embodiments of the first-fourth embodiments when the at least one thermoplastic resin includes a C5 fraction resin, it is partially or fully hydrogenated.

In certain embodiments of the first-fourth embodiments, the at least one thermoplastic resin comprises a cycloaliphatic resin, optionally in combination with one or more of the foregoing resins (e.g., aliphatic, aromatic, hydrogenated aromatic, terpene) and/or optionally partially or fully hydrogenated. Non-limiting examples of cycloaliphatic resins suitable for use as the at least one thermoplastic resin in certain embodiments of the first-fourth embodiments include cyclopentadiene (“CPD”) homopolymer or copolymer resins, and dicyclopentadiene (“DCPD”) homopolymer or copolymer resins. Non-limiting examples of cycloaliphatic copolymer resins include CPD/vinyl aromatic copolymer resins, DCPD/vinyl aromatic copolymer resins, CPD/terpene copolymer resins, DCPD/terpene copolymer resins, CPD/aliphatic copolymer resins (e.g., CPD/C5 fraction copolymer resins), DCPD/aliphatic copolymer resins (e.g., DCPD/C5 fraction copolymer resins), CPD/aromatic copolymer resins (e.g., CPD/C9 fraction copolymer resins), DCPD/aromatic copolymer resins (e.g., DCPD/C9 fraction copolymer resins), CPD/vinyl aromatic copolymer resins (e.g., CPD/styrene copolymer resins), DCPD/vinyl aromatic copolymer resins (e.g., DCPD/styrene copolymer resins), CPD/terpene copolymer resins (e.g., limonene/CPD copolymer resin), and DCPD/terpene copolymer resins (e.g., limonene/DCPD copolymer resins).

In certain embodiments of the first-fourth embodiments, the at least one thermoplastic resin comprises an aromatic resin, optionally in combination with one or more of the foregoing resins (e.g., aliphatic, cycloaliphatic, hydrogenated aromatic, terpene) and/or optionally partially or fully hydrogenated. Non-limiting examples of aromatic resins suitable for use as the at least one thermoplastic resin in certain embodiments of the first-fourth embodiments include coumarone-indene resins and alkyl-phenol resins as well as vinyl aromatic homopolymer or copolymer resins such as those including one or more of the following monomers: alpha-methylstyrene, styrene, ortho-methylstyrene, meta-methylstyrene, para-methylstyrene, vinyltoluene, para(tert-butyl)styrene, methoxystyrene, chlorostyrene, hydroxystyrene, vinylmesitylene, divinylbenzene, vinylnaphthalene or any vinyl aromatic monomer resulting from C9 fraction or C8-C10 fraction. Non-limiting examples of vinylaromatic copolymer resins include vinylaromatic/terpene copolymer resins (e.g., limonene/styrene copolymer resins), vinylaromatic/C5 fraction resins (e.g., C5 fraction/styrene copolymer resin), vinylaromatic/aliphatic copolymer resins (e.g., CPD/styrene copolymer resin, and DCPD/styrene copolymer resin). Non-limiting examples of alkylphenol resins include alkylphenol-acetylene resins such as p-tert-butylphenol-acetylene resins, alkylphenol-formaldehyde resins (such as those having a low degree of polymerization).

In certain embodiments of the first-fourth embodiments, the at least one thermoplastic resin comprises a terpene resin, optionally in combination with one or more of the foregoing resins (e.g., aliphatic, cycloaliphatic, aromatic, hydrogenated aromatic) and/or optionally partially or fully hydrogenated. Non-limiting examples of terpene resins suitable for use as the at least one thermoplastic resin in certain embodiments of the first-fourth embodiments include alpha-pinene resins, beta-pinene resins, limonene resins (e.g., L-limonene, D-limonene, dipentene which is a racemic mixture of L- and D-isomers), beta-phellandrene, delta-3-carene, and delta-2-carene; in certain embodiments of the first-fourth embodiments, the terpene resin is a terpene copolymer resin comprising at least one of the foregoing terpenes in combination with one or more of the foregoing resins (e.g., aliphatic, cycloaliphatic, aromatic, hydrocarbon). An exemplary homopolymer terpene resin is polylimonene. Non-limiting examples of terpene copolymer resins include aliphatic/terpene resins (e.g., DCPD/terpene copolymer resins, and CPD/terpene copolymer resins), terpene/phenol copolymer resins, terpene/vinylaromatic copolymer resins (e.g., limonene/styrene copolymer resins).

In certain embodiments of the first-fourth embodiments, the at least one thermoplastic resin comprises a rosin resin, optionally in combination with one or more of the foregoing resins (e.g., aliphatic, cycloaliphatic, aromatic, hydrogenated aromatic, terpene) and/or optionally partially or fully hydrogenated. Non-limiting examples of rosin resins suitable for use as the at least one thermoplastic resin in certain embodiments of the first-fourth embodiments include gum rosin, wood rosin, and tall oil rosin. Non-limiting examples of modified rosin resins include glycerin ester rosins, and pentaerythritol ester rosins (optionally partially hydrogenated and/or polymerized).

In certain embodiments of the first-fourth embodiments, the at least one thermoplastic resin comprises guayule resin. Guayule resin is a thermoplastic resin obtained from the guayule plant (*Parthenium argentatum*). Guayule resin may be produced as a co-product along with non-Hevea rubber from guayule plants. Guayule resin comprises a mixture of constituents including: terpenes, argentatins, guayulins, fatty acids, aldehydes and alcohols. In certain embodiments of the first-fourth embodiments disclosed herein, the guayule resin comprises (includes) at least one terpene, at least one argentatin, at least one guayulin, or a combination thereof. In certain embodiments of the first-fourth embodiments, the guayule resin comprises at least one of (1)-(6) as follows: (1) at least one terpene selected from d-limonene, limonene, alpha-pinene, beta-pinene, d-verbenone, camphene, alpha-thugene, beta-myrcene, delta-3-carene, terpinolene, beta-ocimene, or santolina triene; (2) at least one fatty acid selected from: cinnamic acid, alpha-linoleic acid, beta-linoleic acid, stearic acid, palmitic acid, palmitoleic acid, or oleic acid; (3) at least one argentatin selected from Argentatin A, Argentatin B, or Argentarin C; (4) at least one guayulin selected from Guayulin A, or Guayulin B; (5) at least one fatty acid (as free fatty acid, monoglyceride, diglyceride, triglyceride, or a combination thereof) selected from linoleic acid, cinnamic acid, linolenic acid, palmitic acid, oleic acid, p-anisic acid, or stearic acid; or (6) low molecular weight polyisoprene rubber having a degree of polymerization of less than 400. Since guayule resins include one or more terpenes, they can be considered to be a terpene resin for purposes of the present disclosure.

In certain embodiments of the first-fourth embodiments, the at least one thermoplastic resin comprises a plant-sourced resin such as guayule resin, terpene resin, rosin resin or a combination thereof. In certain embodiments of the first-fourth embodiments, the at least one thermoplastic resin comprises a plant-sourced resin and no more than 10%, no more than 5% or 0% by weight (based upon the total weight of thermoplastic resin(s)) of a petroleum-sourced resin.

Mixing of the at Least One Thermoplastic Resin

As discussed above, the processes of the first and second embodiments include mixing the rubber-solvent-cement with at least one thermoplastic resin to produce a resin-rubber-solvent-cement. The rubber-solvent-cement can be understood as comprising a mixture of the polymer produced by polymerizing the at least one conjugated diene monomer-containing rubber and the at least one non-polar solvent in which the polymerization has taken place. In certain embodiments of the first and second embodiments, the rubber-solvent-cement may also comprise at least one of: residual solvent from any monomer which was added in solution form (e.g., 1,3-butadiene in hexane) rather than "neat", residual randomizer, or residual terminator. In certain embodiments of the first and second embodiments, particularly in those embodiments wherein the at least one conjugated diene monomer-containing rubber comprises guayule natural rubber, the rubber-solvent-cement may contain residual thermoplastic resin from the guayule plant in varying amounts (e.g., 1-5% by weight based upon the weight of the rubber in the cement). As a non-limiting example, if a rubber-solvent-cement included 100 parts of guayule natural rubber, it could include 1-5 parts of guayule resin. Generally, even in those embodiments wherein the rubber-solvent-cement contains some amount of residual thermoplastic resin (i.e., guayule resin), an additional amount of at least one thermoplastic resin will still need to be added according to the first-fourth embodiments to produce the resin-extended rubber.

The mixing of the at least one thermoplastic resin with the rubber-solvent-cement may be performed according to various methods. In certain embodiments of the first-fourth embodiments, the at least one thermoplastic resin is added directly to the rubber-solvent-cement; in certain such embodiments the at least one thermoplastic resin is added "neat" or without being mixed with any solvent(s). In certain embodiments of the first-fourth embodiments, the at least one thermoplastic resin is dissolved in a solvent prior to addition to the rubber-solvent-cement; in certain such embodiments the solvent comprises a non-polar solvent (e.g., hexane or one of the other non-polar solvents discussed herein) and in other embodiments, the solvent comprises a polar solvent (e.g., tetrahydrofuran). In certain embodiments of the first-fourth embodiments, when the at least one thermoplastic resin is dissolved in a solvent prior to addition to the rubber-solvent-cement, the solvent or solvents utilized excludes any solvent that will cause coagulation of the polymer (e.g., C1-C4 alcohols such as isopropanol); in certain such embodiments, the at least one thermoplastic resin is dissolved in a polar solvent prior to addition to the rubber-solvent-cement wherein the polar solvent does not comprise any alcohol (e.g., C1-C4 alcohols such as isopropanol) or other solvent that will coagulate the polymer. In certain embodiments of the first-fourth embodiments, the at least one thermoplastic resin is added to the rubber-solvent-cement along with a coagulant (e.g., methanol, ethanol, or isopropanol).

Resin-Extended Rubber-Solvent-Cement

As discussed above, the third embodiment disclosed herein is directed to a resin-extended rubber-solvent-cement. The resin-extended rubber-solvent-cement of the third embodiment comprises: 100 parts of at least one conjugated diene monomer-containing rubber, at least one non-polar solvent, and 5 to 100 phr of at least one thermoplastic resin. The resin-extended rubber-solvent-cement can be understood as containing rubber, resin, and the at least one non-polar solvent that served as the polymerization solution. In other words, the at least one conjugated diene monomer-containing rubber has been polymerized, at least one thermoplastic resin has been added, but because the at least one non-polar solvent has not (yet) been removed, it is a cement rather than a resin-extended rubber that is produced by removing the at least one polar solvent from the resin-extended rubber-solvent-cement. The processes of the first and second embodiments disclosed can be understood as having a step that includes a resin-extended rubber-solvent-cement and in the context of those processes it can also be referred to as a resin-rubber-solvent-cement. While the third embodiment comprises 5 to 100 phr of at least one thermoplastic resin, the particular type or types of thermoplastic resin as well as the total amount should be understood as including fully those options discussed above in the section entitled "Thermoplastic Resin" as if fully set forth herein.

Oils

In certain embodiments of the first-fourth embodiments, at least one oil is used along with the at least one thermoplastic resin to extend the rubber. One or more than one oil can be used. In other embodiments of the first-fourth embodiments, no oil (i.e., 0 phr) of oil is used with the at least one thermoplastic resin to extend the rubber. According to certain embodiments of the processes of the first and second embodiments and certain embodiments of the third and fourth embodiments, when at least one oil is utilized, it will be added to the rubber-solvent-cement; in such embodiments, the at least one oil can be added to the rubber-solvent-cement along with the at least one thermoplastic resin (e.g., in a pre-blend or in separate streams at the same time), prior to the addition of the at least one thermoplastic resin, or after the addition of the at least one thermoplastic resin. Similarly, according to certain embodiments of the third embodiment, the resin-extended rubber-solvent-cement includes (further comprises) at least one oil. Generally, the at least one oil will be added to the cement containing the solubilized rubber prior to removal of the at least one polar solvent from the cement to produce a resin-extended rubber.

According to the first-fourth embodiments disclosed herein, when at least one oil is utilized, the particular type of oil used can vary. Generally, any oil utilized will be compatible with the rubber, which rubber is at least one conjugated diene monomer-containing rubber such as styrene-butadiene rubber, polybutadiene rubber, natural rubber, polyisoprene, and combinations thereof (and/or one of the other rubber discussed above). In certain embodiments of the first-fourth embodiments, the oil comprises at least one of: a plant oil, a petroleum oil, or a combination thereof. Thus, one or more than one plant oil can be utilized; one or more than one petroleum oil can be utilized; one plant oil and more than one petroleum oil can be utilized; or one petroleum oil and more than one plant oil can be utilized. Various types of petroleum oils may be suitable for use in certain embodiments of the first-fourth embodiments disclosed herein including aromatic, naphthenic, paraffinic, or low PCA petroleum oils. The phrase "low PCA" refers to those oils having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15 and FLEXON 683 from EXXONMOBLE, VIVATEC 200 from BP, PLAXOLENE MS from TOTALFINAELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H2000, CROSS C2000, CROSS C2400, and SAN JOAQUIN 2000L. Plant oils, as discussed below, will also generally qualify as low PCA. Suitable plant oils for use in certain embodiments of the first-fourth embodiments disclosed herein include those that can be harvested from vegetables, nuts, and seeds. Non-limiting examples of suitable plant oils for use in certain embodiments of the first-fourth embodiments disclosed herein include, but are not limited to, soy or soybean oil, sunflower oil, safflower oil, corn oil, peanut oil, olive oil, grape seed oil, hazelnut oil, rice oil, safflower oil, sesame oil, mustard oil, flax oil, linseed oil, cotton seed oil, rapeseed oil, cashew oil, sesame oil, camellia oil, jojoba oil, macadamia nut oil, coconut oil, palm kernel oil, and palm oil. In certain embodiments of the first-fourth embodiments disclosed herein, the oil is a liquid at 25° C. In certain embodiments of the first-fourth embodiments disclosed herein, the oil comprises a combination of plant oils such as more than one of the foregoing plant oils; such a combination of plant oils is sometimes called a vegetable oil. In certain embodiments of the first-fourth embodiments disclosed herein, the oil comprises (includes) soybean oil. In certain embodiments of the first-fourth embodiments disclosed herein, the oil comprises (includes) sunflower oil; in certain such embodiments, the sunflower oil comprises high-oleic sunflower oil (e.g., having an oleic acid content of at least 60%, at least 70%, or at least 80% by weight oleic acid).

In those embodiments of the first-fourth embodiments where at least one oil is utilized in addition to the at least one thermoplastic resin, the amount of oil used may vary. In certain embodiments of the first-fourth embodiments disclosed herein, when at least one oil is utilized in addition to the at least one thermoplastic resin, the amount of oil used is about 1 to about 50 phr, including 1-50 phr (e.g., 1 phr, 5 phr, 10 phr, 15 phr, 20 phr, 25 phr, 30 phr, 35 phr, 40 phr, 45 phr, 50 phr), about 5 to about 40 phr, 5-40 phr, about 10 to about 40 phr, 10-40 phr, about 15 to about 40 phr, 15-40 phr, about 20 to about 40 phr, and about 20-40 phr. In those embodiments of the first-fourth embodiments where more than one oil is utilized the foregoing ranges should be understood to apply to the total amount of oil utilized in addition to the at least one thermoplastic resin.

Rubber Compositions

Also disclosed herein are rubber compositions comprising the resin-extended rubber produced according to the process of the first embodiment, the resin-extended rubber produced according to the process of the second embodiment, or the resin-extended rubber which can be produced by removing the solvent from the resin-extended rubber-solvent-cement of the third embodiment. The foregoing rubber composition can be considered to be a fourth embodiment that is disclosed herein. Without being bound by theory, it is believed that addition of the resin to the rubber at the cement stage (thereby yielding the resin-extended rubber disclosed herein) can result in certain improved properties when the resin-extended rubber is formed into a rubber composition along with other ingredients, the improved properties being as compared to a rubber composition having the same ingredients except that the resin is added during the compounding of the rubber with the other ingredients and rather than to the cement. According to this fourth embodiment, the rubber composition comprises the resin-extended rubber, at least one reinforcing filler, and a cure package. In certain embodiments of the fourth embodiment, the rubber composition comprises 10-100 parts of the resin-extended rubber, optionally at least one additional rubber, 5-200 parts of at least one reinforcing filler, and a cure package. In certain embodiments of the fourth embodiment, the amount of the resin-extended rubber is 10-90 parts (e.g., 10, 15, 20, 25, 30, 35, 40, 45, 50, 55, 60, 65, 70, 75, 80, 85, or 90 parts), 10-80 parts, 10-70 parts, 10-60 parts, 10-50 parts, 10-40 parts, 10-30 parts, 20-90 parts, 20-80 part, 20-70 parts, 20-60 parts, 20-50 parts, 20-40 parts, 20-30 parts, 30-90 parts, 30-80 parts, 30-70 parts, 30-60 parts, 30-50 parts, 30-40 parts, 40-90 parts, 40-80 parts, 40-70 parts, 40-60 parts, or 40-50 parts with the remaining amount necessary to constitute 100 parts rubber being comprised of the at least one additional rubber. In certain embodiments of the fourth embodiment, the rubber composition comprises: (a) resin-extended rubber comprising n parts of rubber including at least one conjugated diene monomer-containing rubber and up to 100 phr of at least one thermoplastic resin, wherein n is an integer from 10 to 100; (b) optionally at least one additional rubber in an amount of 100−n parts; (c) at least one reinforcing filler in a total amount of 10-200 phr; and (d) a cure package. The n parts of rubber of component (a) can vary from 10 to 100 parts (e.g., 10, 15, 20, 25, 30, 35, 40, 45, 50, 55, 60, 65, 70, 75, 80, 85, 90, 95, 100 parts) with the understanding that the total amount of all rubbers from component (a) and component (b) is 100 parts. As a non-limiting example, in an exemplary rubber composition according to the fourth embodiment, component (a) could comprise 90 parts of SBR and 22.75 parts of resin and component (b) could comprise 10 parts of natural rubber for a total amount of all rubbers from (a) and (b) being 100 parts. In certain embodiments of the fourth embodiment, all of the resin of the rubber composition is added in the form of resin-extended rubber. In other embodiments of the fourth embodiment, only a portion of the resin of the rubber composition is added in the form of resin-extended rubber and the rest is added as free resin; in certain such embodiments, a majority of the resin of the rubber composition is added in the form of resin-extended rubber. In certain embodiments of the fourth embodiment, component (a) consists only of n parts at least one conjugated diene monomer-containing rubber and up to 100 phr of at least one thermoplastic resin. In certain embodiments of the fourth embodiment, component (b) consists only of the rubbers discussed below as additional rubbers. Also disclosed herein is a process for preparing a rubber composition according to the fourth embodiment, wherein a resin-extended rubber as described above (e.g., produced according to the process of the first and second embodiments or as resulted therefrom) is mixed with components (b), (c) and (d).

Additional Rubbers

Suitable rubbers for use as the at least one additional rubber in the rubber compositions of certain embodiments of the fourth embodiment disclosed herein are well known to those skilled in the art and include but are not limited to the following: synthetic polyisoprene rubber, natural rubber, styrene-butadiene rubber (SBR), styrene-isoprene rubber, butadiene-isoprene-rubber, styrene-isoprene-butadiene rubber, polybutadiene, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, tetrafluoroethylene-propylene rubber, and combinations thereof. Examples of fluorinated rubber include perfluoroelastomer rubber, fluoroelastomer, fluorosilicone, tetrafluoroethylene-propylene rubber, and combinations thereof. In certain embodiments of the fourth embodiment, the at least one additional rubber comprises at least one conjugated diene monomer-containing rubber; in certain such embodiments, the at least one additional rubber comprises at least one of: styrene-butadiene copolymer, polybutadiene (preferably high-cis), natural rubber, polyisoprene, butyl rubber, neoprene, styrene-isoprene rubber, butadiene-isoprene rubber, styrene-isoprene-butadiene rubber, or EPDM rubber. In certain embodiments of the fourth embodiment, the at least one additional rubber comprises at least one of: styrene-butadiene copolymer, polybutadiene (preferably high-cis), natural rubber, or polyisoprene. In certain embodiments of the fourth embodiment, the at least one additional rubber consists of at least one of: styrene-butadiene copolymer, polybutadiene (preferably high-cis), natural rubber, or polyisoprene. As explained above, the total amount of additional rubber(s) in the rubber compositions of the fourth embodiment, is an amount of 100−n such that the total amount of rubber from the resin-extended rubber and the additional rubber(s) constitutes 100 parts. Taking into account that n is an integer from 10 to 100, the total amount of additional rubber(s) may constitute varying amounts such as 90, 85, 80, 75, 70, 65, 60, 55, 50, 45, 40, 35, 30, 25, 20, 15, 10, or 5 parts.

Reinforcing Fillers

The term "reinforcing filler" is used herein to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments, the term "reinforcing filler" is alternatively or additionally used to refer to a particulate material that has a particle size of about 10 nm up to about 1000 nm, including 10 nm up to 1000 nm, about 10 nm up to about 50 nm, and 10 nm up to 50 nm. In certain embodiments of the fourth embodiment, the at least one reinforcing filler includes at least one carbon black, at least one silica, or a combination thereof. In certain embodiments of the fourth embodiment, the total amount of at least one reinforcing filler is including about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, or 35 to 80 phr.

Silica Fillers

Suitable silica fillers for use in the rubber compositions of the fourth embodiment disclosed herein are well known. Non-limiting examples of silica fillers suitable for use in certain embodiments of the fourth embodiment disclosed herein include, but are not limited to, precipitated amorphous silica, wet silica (hydrated silicic acid), dry silica (anhydrous silicic acid), fumed silica, calcium silicate and the like. Other suitable silica fillers for use in rubber compositions of certain embodiments of fourth embodiment disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4 \cdot 3SiO_4 \cdot 5H_2O$ etc.), aluminum calcium silicate ($Al_2O_3 \cdot CaO_2SiO_2$, etc.), and the like. Among the listed silica fillers, precipitated amorphous wet-process, hydrated silica fillers are preferred. Such silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different silica fillers. In certain embodiments of the fourth embodiment disclosed herein, the rubber composition comprises a silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the fourth embodiment disclosed herein, the rubber composition comprises silica filler having a pH of about 5.5 to about 7 or slightly over 7, preferably about 5.5 to about 6.8. Some of the commercially available silica fillers which can be used in the rubber compositions of certain embodiments of the fourth embodiment disclosed herein include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). As well, a number of useful commercial grades of different silica fillers are also available from Degussa Corporation (e.g., VN2, VN3), Rhone Poulenc (e.g., Zeosil™ 1165MP), and J. M. Huber Corporation.

In certain embodiments of the fourth embodiment disclosed herein, the silica filler comprises a silica that has been pre-reacted with a silica coupling agent; preferably the pre-treated silica comprises a silica that has been pre-treated with a silane-containing silica coupling agent.

Silica Coupling Agents

In certain embodiments of the fourth embodiment disclosed herein, one or more silica coupling agents is utilized in the rubber composition. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processability and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the fourth embodiment disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments of the fourth embodiment, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^1_pSi(OR^2)_{4-p}$ where each $R^2$ is independently a monovalent organic group, and p is an integer from 1 to 3, with the proviso that at least one $R^1$ is an alkyl group. Preferably p is 1. Generally, each $R^1$ independently comprises $C_1$ to $C_{20}$ aliphatic, $C_5$ to $C_{20}$ cycloaliphatic, or $C_6$ to $C_{20}$ aromatic; and each $R^2$ independently comprises $C_1$ to $C_6$ aliphatic. In certain exemplary embodiments, each $R^1$ independently comprises $C_6$ to $C_{15}$ aliphatic and in additional embodiments each $R^1$ independently comprises $C_8$ to $C_{14}$ aliphatic. Mercapto silanes have the general formula $HS—R^3—Si(R^4)(R^5)_2$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B—S—R^6—Si—X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^6$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain embodiments of the fourth embodiment disclosed herein include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the fourth embodiment disclosed herein include bis(trialkoxysilylorgano) disulfides and bis(trialkoxysilylorgano)tetrasulfides. Specific non-limiting examples of bis(trialkoxysilylorgano) disulfides suitable for use in certain exemplary embodiments of the fourth embodiment disclosed herein include, but are not limited to, 3,3'-bis(triethoxysilylpropyl) disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano) tetrasulfide silica coupling agents suitable for use in certain embodiments of the fourth embodiment disclosed herein include, but are not limited to, bis(3-triethoxysilylpropyl) tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of the fourth embodiment disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiment of the fourth embodiment disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, NY.

Non-limiting examples of pre-treated silicas (i.e., silicas that have been pre-surface treated with a silane) suitable for use in certain embodiments of the fourth embodiment disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. Coupsil 6508, Agilon 400™ silica from PPG Industries, Agilon 454® silica from PPG Industries, and 458® silica from PPG Industries. In those embodiments where the silica comprises a pre-treated silica, the pre-treated silica is used in an amount as previously disclosed for the silica filler (i.e., about 5 to about 200 phr, including 5 to 200 phr, about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr about 5 to about 200 phr, including about 25 to about 150 phr, about 35 to about 150 phr, about 25 to about 125 phr, about 25 to about 100 phr, about 25 to about 80 phr, about 35 to about 125 phr, about 35 to about 100 phr, and about 35 to about 80 phr).

When a silica coupling agent is utilized in a rubber composition according to the fourth embodiment disclosed herein, the amount used may vary. In certain embodiments of the fourth embodiment disclosed herein, the rubber compositions do not contain any silica coupling agent. In other embodiments of the fourth embodiment disclosed herein, the silica coupling agent is present in an amount sufficient to provide a ratio of the total amount of silica coupling agent to silica filler of about 1:100 to about 1:5 (i.e., about 0.01 to about 20 parts by weight per 100 parts of silica), including 1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the fourth embodiment disclosed herein, the rubber composition comprises about 0.01 to about 10 phr silica coupling agent, including 0.01 to 10 phr, about 0.01 to about 5 phr, 0.01 to 5 phr, about 0.01 to about 3 phr, and 0.01 to 3 phr.

Carbon Black

In certain embodiments of the fourth embodiment disclosed herein, a carbon black filler is utilized in the rubber composition. Most (but not all) carbon blacks are reinforcing fillers. In those embodiments of the fourth embodiment that include one or more carbon blacks, the total amount of carbon black and any other reinforcing filler (e.g., silica filler) is about 10 to about 200 phr (including 10 to 200 phr).

In certain embodiments of the fourth embodiment disclosed herein, carbon black is included in an amount of from zero to about 50% by weight of the total reinforcing filler, including zero to 50%, about 5% to about 30%, 5% to 30%, from about 5% to about 20%, 5% to 20%, about 10% to about 30%, 10% to 30%, about 10% to about 20%, and 10% to 20% by weight of the total reinforcing filler. In certain embodiments of the fourth embodiment disclosed herein, the carbon black comprises no more than about 30% by weight (including no more than 30% by weight) of the total reinforcing filler in the rubber composition. In certain embodiments of the fourth embodiment disclosed herein, the rubber composition comprises about 5 to about 100 phr (including 5 to 100 phr) of one or more carbon blacks. Generally, suitable carbon black for use in certain embodiments of the fourth embodiment disclosed herein includes any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the fourth embodiment disclosed herein, the rubber composition includes a mixture of two or more of the foregoing blacks. Typical suitable carbon blacks for use in certain embodiments of the fourth embodiment disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Other Fillers

In certain embodiments of the fourth embodiment, the at least one reinforcing filler includes at least one filler other than carbon black and/or silica. In certain embodiments of the fourth embodiment, the at least one reinforcing filler includes at least one filler in addition to carbon black and/or silica. Non-limiting examples of suitable additional reinforcing fillers for use in certain embodiments of the fourth embodiment disclosed herein include, but are not limited to, alumina, aluminum hydroxide, clay, magnesium hydroxide, boron nitride, aluminum nitride, titanium dioxide, reinforcing zinc oxide, and combinations thereof. In certain embodiments of the fourth embodiment, at least one inorganic filler in addition to the silica filler and the optional carbon black is utilized. Suitable inorganic fillers for use in certain embodiments of the fourth embodiment disclosed herein are not particularly limited and non-limiting examples include: aluminum hydroxide, talc, clay, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), pyrofilite ($Al_2O_34SiO_2{\cdot}H_2O$), bentonite ($Al_2O_3{\cdot}4SiO_2{\cdot}2H_2O$), boron nitride, mica, kaolin, glass balloon, glass beads, calcium oxide (CaO), calcium hydroxide ($Ca(OH)_2$), calcium carbonate ($CaCO_3$), magnesium carbonate, magnesium hydroxide ($MH(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2{\cdot}nH_2O$], zirconium carbonate [$Zr(CO_3)_2$], crystalline aluminosilicates, reinforcing grades of zinc oxide (i.e., reinforcing zinc oxide), and combinations thereof.

Cure Package

As discussed above, according to the fourth embodiment a cure package is utilized in the rubber composition. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments of the fourth embodiment, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in certain embodiments of the fourth embodiment, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in certain embodiments of the fourth embodiment disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other Ingredients

Various other ingredients that may optionally be added to the rubber compositions of the fourth embodiment disclosed herein are well known to those of skill in the art and include processing oils, waxes, processing aids, tackifying resins, reinforcing resins, and peptizers.

Various types of processing and extender oils may be utilized, including, but not limited to aromatic, naphthenic, and low PCA oils, as discussed above. Generally, for most applications the total amount of oil used (processing oil and any extender oil) in the rubber compositions and methods disclosed herein ranges from about 1 to about 70 phr, including 1 to 70 phr, about 2 to about 60 phr, 2 to 60 phr, about 3 to about 50 phr, and 3 to 50 phr. However, in certain applications, the total amount of oil used (processing oil and any extender oil) in the rubber compositions and methods disclosed herein is much higher and ranges up to about 175 phr, including up to 175 phr, up to about 150 phr, up to 150 phr, up to about 100 phr, and up to 100 phr.

Methods for Preparing Rubber Compositions

Rubber compositions according to the fourth embodiment disclosed herein may generally be formed by mixing together the ingredients for the rubber composition (as disclosed above) by methods known in the art, such as, for example, by kneading the ingredients together in a Banbury mixer or on a milled roll. These methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the fourth embodiment, more than one non-productive master-batch mixing stage may be used in preparing the rubber composition. In certain embodiments of the fourth embodiment, more than one non-productive master-batch mixing stage is used. Where a rubber composition of the fourth embodiment includes fillers other than (or in addition to) carbon black, a separate re-mill stage or stages may be employed for separate addition of a portion or all of the other fillers. Such a stage or stages can be performed at temperatures similar to, although often slightly lower than, those employed in the master-batch stage, i.e., ramping from about 90° C. to a drop temperature of about 150° C.

In certain embodiments of the fourth embodiment, the rubber composition is prepared by a process with the non-productive master batch mixing stage(s) conducted at a temperature of about 130° C. to about 200° C. In certain embodiments of the fourth embodiment, the rubber composition is prepared by a process with the final productive mixing stage conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

As mentioned above with respect to the first and second embodiments, in certain embodiments, the thermoplastic resin is pre-mixed with a portion of non-polar solvent(s) prior to the mixing of the rubber-solvent-cement with the resin; in such embodiments, the total amount of thermoplastic resin is as discussed herein (e.g., up to 100 phr). Such pre-mixing of the thermoplastic resin with at least one non-polar solvent may optionally be utilized in preparing rubber compositions according to the fourth embodiment.

Increase in Viscosity

In certain embodiments of the fourth embodiment, the rubber composition exhibits an increased viscosity from the use of the resin-extended rubber. Methods for increasing the viscosity of a rubber composition by utilizing resin-extended rubber to prepare rubber compositions according to the fourth embodiment described herein should be considered to be fully disclosed herein. The increased viscosity is as compared to a comparative rubber composition containing identical ingredients except for replacing the resin-extended rubber with an equivalent amount of free resin and rubber. The magnitude of the increase in viscosity achieved from utilizing resin-extended rubber may vary. In certain embodiments of the fourth embodiment, the rubber composition exhibits an increase in viscosity of at least 5% (e.g., 5%, 10%, 15%, 20%, 25%, 25% or more), at least 10% (e.g., 10%, 15%, 20%, 25% or more), about 15%, 5-25%, about 5 to about 25%, 5-20%, or about 5 to about 20%. The increase in viscosity can be measured by comparing real dynamic viscosities of the rubber composition and the comparative rubber composition, using, for example, the RPA procedure described below in the Examples. The increase in viscosity which can be achieved by using resin-extended rubber may be beneficial for the formulation of rubber compositions containing higher amounts of resin.

Examples

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular conjugated diene monomer-containing rubber used in the rubber-solvent-cement, the particular thermoplastic resin used in the following examples and their respective amounts should not be interpreted as limiting since other such ingredients and amounts consistent with the disclosure in the Detailed Description can be utilized in substitution. In other words, the particular conjugated diene monomer-containing rubber used in the rubber-solvent-cement, particular thermoplastic resin, and their relative amounts as used in the following examples should be understood to apply to the more general content of the Detailed Description. Similarly, the particular conjugated diene monomer-containing rubber, the particular thermoplastic resin used therein, as well as the other ingredients used therein (e.g., fillers, cure package, etc.) used in the rubber composition and their respective amounts should not be interpreted as limiting since other such ingredients and amounts consistent with the disclosure in the Detailed Description can be used in substitution. In other words, the particular conjugated diene monomer-containing rubber used in the rubber composition, particular thermoplastic resin, and their relative amounts should be understood to apply to the more general content of the Detailed Description.

Two styrene-butadiene copolymer (rubber) containing cements are prepared as Sample 1 and Sample 2 according to the following procedures.

Sample 1: A 5-liter reactor which has been dried and purged with nitrogen is washed with dried and de-aerated cyclohexane and an n-butyl lithium solution. Then, 2910 grams of a 15.5% solution of 1,3-butadiene in hexane is poured into the reactor by nitrogen pressure. While stirring, the temperature in the reactor is adjusted to 50° C., followed by the addition of 0.96 milliliters of a 1.6 N n-butyl lithium solution. After completion of polymerization a rubber-solvent-cement is produced. A sample of the cement is taken to which isopropyl alcohol containing 1 part by weight of 2,6-di-t-butyl-p-cresol as antioxidant is added so that the polymerization is completely terminated. Upon isolation (and drying) of the polymer from the cement, the polymer is found to have a weight-average molecular weight of 850,000 grams/mole.

Sample 2: The procedure used to prepare Sample 1 is followed except that the amount of n-butyl lithium solution used is increased to 25 milliliters. Again, a sample of the cement is taken. Upon isolation (and drying) of the polymer from the cement, the polymer is found to have a weight-average molecular weight of 200,000 grams/mole.

Samples of the cements resulting from the procedure of Sample 1 or the procedure of Sample 2 are blended with at least one thermoplastic resin according to the formulations presented in Tables 1A and 1B. The blending takes place after completion of the polymerization and after addition of the terminator and antioxidant but before isolation and drying of the polymer. The amount of resin added is presented in parts per hundred parts of rubber (which can be determined by measuring the amount of rubber contained within a given sample of the cement and extrapolating to determine the amount of rubber in a sample used for blending with the thermoplastic resin). Cement 1 is used to refer to samples of cement taken from Sample 1. Cement 2 is used to refer to samples of cement taken from Sample 2. Resin 1 is guayule resin. Resin 2 is Nevtac® 115, a thermoplastic resin available from Neville Chemical Company (Pittsburgh, PA) and described by its manufacturer as an aliphatic low molecular weight thermoplastic hydrocarbon resin produced from catalytic polymerization of petroleum-derived $C_5$ feedstocks and having a Mn of 1800 and Mw of 4600 (according to ASTM D5296), an R&B softening point of 115° C. (according to ASTM D28). Resin 3 is SP-6700 resin, a thermoplastic novolak resin (more specifically a modified phenol-formaldehyde resin) available from Sovereign Chemical Company (Akron, OH), described by its manufacturer as having a R&B softening point of 90-100° C. (test method T06M02.01).

TABLE 1A

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Cement 1 | 100 | 100 | 100 | 100 | 100 | 100 | 100 | 100 | 100 |
| Resin 1 | 10 | 50 | 90 | 0 | 0 | 0 | 0 | 0 | 0 |
| Resin 2 | 0 | 0 | 0 | 10 | 50 | 90 | 0 | 0 | 0 |
| Resin 3 | 0 | 0 | 0 | 0 | 0 | 0 | 10 | 50 | 90 |

TABLE 18

| | Ex. 10 | Ex. 11 | Ex.12 | Ex. 13 | Ex. 14 | Ex. 15 | Ex. 16 | Ex. 17 | Ex. 18 |
|---|---|---|---|---|---|---|---|---|---|
| Cement 2 | 100 | 100 | 100 | 100 | 100 | 100 | 100 | 100 | 100 |
| Resin 1 | 10 | 50 | 90 | 0 | 0 | 0 | 0 | 0 | 0 |
| Resin 2 | 0 | 0 | 0 | 10 | 50 | 90 | 0 | 0 | 0 |
| Resin 3 | 0 | 0 | 0 | 0 | 0 | 0 | 10 | 50 | 90 |

Rubber Compositions A-C: Rubber Compositions A, B and C were formulated using the ingredients provided in Table 2 where the amounts of ingredients are listed in phr. The mixing procedure for preparing the compositions is shown below in Table 3. Compositions A and B are controls since they utilize free oil and free resin, respectively, rather than the resin-extended rubber used in Composition C. The resin-extended SBR utilized in Composition C was created by adding solvent to a solid version of the solution SBR used in Compositions A and B to first create a rubber-solvent-cement and then mixing the hydrocarbon resin into the rubber-solvent-cement to produce a resin-rubber-solvent-cement; more specifically, 7500 grams of n-hexanes as solvent were mixed with 1100 grams of solid SBR. The same hydrocarbon resin used in Composition A was used in Compositions B and C. In creating Composition C, 278 grams of hydrocarbon resin were pre-mixed with 325 grams of n-hexanes as solvent prior to mixing the resin with the rubber-solvent-cement.

TABLE 2

| Ingredient | Composition A | Composition B | Composition C |
|---|---|---|---|
| Master-Batch 1 | | | |
| Solution SBR[1] | 90 | 90 | 0 |
| Resin-extended SBR[2] | 0 | 0 | 112.75 |
| Natural rubber | 10 | 10 | 10 |
| Carbon black (N234) | 7 | 7 | 7 |
| Silica | 50 | 50 | 50 |
| Silica coupling agent | 5 | 5 | 5 |
| Processing oil[3] | 22.75 | 0 | 0 |
| Antioxidant 1 (wax) | 2 | 2 | 2 |
| Hydrocarbon resin[4] | 0 | 22.75 | 0 |
| Master-Batch 2 | | | |
| Silica | 30 | 30 | 30 |
| Silica coupling agent | 3 | 3 | 3 |
| Processing oil | 14.73 | 14.73 | 14.73 |
| Processing aid 1 | 0.5 | 0.5 | 0.5 |
| Vulcanizing activator 1 | 2 | 2 | 2 |

TABLE 2-continued

| Ingredient | Composition A | Composition B | Composition C |
|---|---|---|---|
| Master-Batch 3 | | | |
| Silica | 20 | 20 | 20 |
| Silica coupling agent | 2 | 2 | 2 |
| Processing aid 2 | 1.3 | 1.3 | 1.3 |
| Processing aid 1 | 0.5 | 0.5 | 0.5 |
| Final batch | | | |
| Vulcanizing agent (sulfur) | 1.5 | 1.5 | 1.5 |
| Vulcanization accelerators | 4 | 4 | 4 |
| Vulcanizing activator 2 | 2.5 | 2.5 | 2.5 |
| Antioxidant 2 | 0.2 | 0.2 | 0.2 |

[1]Styrene-butadiene rubber with 23.5% styrene, Tg −62° C.

[2]Prepared with 22.75 parts of hydrocarbon resin to 90 parts of rubber

[3]Low polycyclic aromatic content oil

[4]Dicyclopentadiene resin with blend of C5 and C9 resins, having Mn of 2908 and softening point of 105° C.

TABLE 3

Mixing Parameters for Rubber Compositions A to C

| Stage | Time | Condition |
|---|---|---|
| Master-Batch 1 (initial temp: 65° C., rotor rpm started at 65) | 0 sec<br>30 sec | Charge polymers<br>Charge any oil, fillers and other master-batch ingredients Increase rotor to 75 rpm<br>Drop based on max temperature of 311° F. (155° C.) |
| Master-Batch 2 (initial temp: 65° C., rotor rpm started at 65) | 0 sec | Charge ingredients from Master-Batch 1, add Master-Batch 2 ingredients<br>Drop based on max temperature of 302° F. (150° C.) |
| Master-Batch 3 (initial temp: 65° C., rotor rpm started at 65) | 0 sec | Charge ingredients from Master-Batch 2, add Master-Batch 3 ingredients<br>Drop based on max temperature of 302° F. (150° C.) |
| Final Batch Stage (initial temp: 65° C., rotor rpm at 65) | 0 sec<br>0 sec | Charge ingredients from Master-Batch 3<br>Charge curatives<br>Drop based on max temperature of 210° F. (99° C.) |

After curing at 170° C. for 15 minutes, each of the rubber compositions was tested for tensile properties. The results testing of the formulations of Table 2 are shown in Table 4, below. The abbreviation Eb is used for elongation at break and Tb for stress at break, which measurements provide an indication of a rubber composition's tear resistance, which is particularly relevant when it is incorporated into a tire tread. The abbreviation M300 is used for tensile stress at 300% elongation. The abbreviation E' is used for dynamic storage modulus, which provides a measure of the hardness of the rubber composition; steering stability on a dry road surface (dry performance) is generally impacted by E' with higher values preferred. The index values listed in Table 4 were determined by comparing the value for the formulation according to the present disclosure with the respective value for the control (i.e., dividing the test value by the control value), using Rubber Composition A as the control.

The dynamic storage modulus (E') and tan δ values were measured with a dynamic mechanical thermal spectrometer (Eplexor® 500N from Gabo Qualimeter Testanlagen GmbH of Ahiden, Germany) under the following conditions: measurement mode: tensile test mode, measuring frequency: 52 Hz, applying 0.2% strain from 50 to −5° C. and 1% strain from −5 to 65° C., measuring temperatures (as indicated in Table 4 below), sample shape: 4.75 mm wide×29 mm long×2.0 mm thick. A rubber composition's tan δ at 0° C. is indicative of its wet traction when incorporated into a tire tread, its tan δ at 30° C. is indicative of its dry traction when incorporated into a tire tread and its tan δ at 60° C. is indicative of its rolling resistance when incorporated into a tire tread.

The viscosities disclosed herein are real dynamic viscosities determined using an Alpha Technologies RPA (Rubber Process Analyzer) instrument which is rotorless. Measurements were made following the guidance of, but not strictly according to ASTM D 6204. In accordance with ASTM D 6204, a three point frequency sweep was conducted. The rubber compositions were pre-heated for 1 minute at 130° C. In accordance with the ASTM procedure, strain sweep was conducted at 130° C., strain at 100 percent, and 1 Hz were conducted. The viscosity data reported is from a run conducted at 266° F., G' at 0.2 minutes.

TABLE 4

| Property | Composition A | Composition B | Composition C |
|---|---|---|---|
| Indexed RPA viscosity | 100 | 108 | 124 |
| Indexed $M_{300}$ | 100 | 75 | 75 |
| Indexed $T_b$ | 100 | 93 | 89 |
| Indexed $E_b$ | 100 | 136 | 135 |
| Indexed E' 30° C. | 100 | 103 | 105 |
| Indexed Tan δ 0° C. | 100 | 129 | 133 |
| Indexed Tan δ 30° C. | 100 | 128 | 130 |
| Indexed Tan δ 60° C. | 100 | 130 | 131 |

As can be seen from the data in Table 4, the compositions wherein 22.75 phr of processing oil was replaced with resin (i.e., Compositions B and C), exhibited an increased viscosity. However, the increase in viscosity for the composition using resin-extended rubber (i.e., Composition C) was more pronounced than for the composition using free resin (i.e., Composition B). The increased viscosity (15% higher) exhibited by Composition C as compared to Composition B was unexpected. The other property values listed in Table 4 (e.g., Tb and Eb) for Compositions B and C varied more than 10% from the respective value for Composition A, but varied by 5% or less from each other.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles “a” or “an” limits any particular claim containing such introduced claim recitation to inventions containing only one such recitation, even when the same claim includes the introductory phrases “one or more” or “at least one” and indefinite articles such as “a” or “an” (e.g., “a” or “an” should typically be interpreted to mean “at least one” or “one or more”); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of “two recitations,” without other modifiers, typically means at least two recitations, or two or more recitations). Furthermore, in those instances where a convention analogous to “at least one of A, B, and C, etc.” is used, in general such a construction is intended in the sense one having skill in the art would understand the convention (e.g., “a system having at least one of A, B, and C” would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase “A or B” will be understood to include the possibilities of “A” or “B” or “A and B.”

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

It is claimed:

1. A resin-extended rubber-solvent-cement comprising:

a. 100 parts of at least one conjugated diene monomer-containing rubber, b. at least one non-polar solvent, and c. 5 to 100 phr of at least one thermoplastic resin, wherein the at least one thermoplastic resin is guayule resin, a dicyclopentadiene resin, or both;

wherein the non-polar solvent is selected from the group consisting of: alkanes having from 4 to 9 carbon atoms, cycloalkanes or alkyl cycloalkanes having from 5 to 10 carbon atoms, or aromatics and alkyl substituted aromatics having from 6 to 12 carbon atoms.

2. The resin-extended rubber-solvent-cement of claim 1, wherein the at least one conjugated diene monomer-containing rubber comprises at least one of styrene-butadiene copolymer, polybutadiene, styrene-isoprene rubber, styrene-butadiene-isoprene rubber, natural rubber, or polyisoprene.

3. The resin-extended rubber-solvent-cement of claim 1, wherein the at least one thermoplastic resin meets at least one of the following:

a. has a Mn of 400 to 5000 grams/mole;

b. is a solid at 25° C.;

c. has a Tg of at least 25° C.

4. The resin-extended rubber-solvent-cement of claim 3, where each of (a)-(c) is met.

5. The resin-extended rubber-solvent-cement of claim 1, further comprising at least one petroleum oil or plant oil.

6. A rubber composition comprising:

a. resin-extended rubber comprising n parts of rubber including at least one conjugated diene monomer-containing rubber and up to 100 phr of at least one thermoplastic resin, wherein n is an integer from 10 to 100;

b. optionally at least one additional rubber in an amount of 100−n parts;

c. at least one reinforcing filler in a total amount of 10-200 phr; and d. a cure package;

wherein the at least one thermoplastic resin is guayule resin.

7. The rubber composition of claim 6, wherein at least one of the following is met:

the at least one conjugated diene monomer-containing rubber comprises at least one of styrene-butadiene copolymer, polybutadiene, styrene-isoprene rubber, styrene-butadiene-isoprene rubber, natural rubber, or polyisoprene.

8. The rubber composition of claim 7, wherein the at least one thermoplastic resin meets at least one of the following:

c. has a Mn of 400 to 5000 grams/mole;

d. is a solid at 25° C.;

e. has a Tg of at least 25° C.

9. The rubber composition of claim 8, wherein each of (a)-(e) are met.

10. The rubber composition of claim 8, wherein the at least one thermoplastic resin is a dicyclopentadiene resin.

11. A resin-extended rubber-solvent-cement comprising:

a. 100 parts of at least one conjugated diene monomer-containing rubber, wherein the at least one conjugated diene monomer-containing rubber comprises at least one of styrene-butadiene copolymer, polybutadiene, styrene-isoprene rubber, styrene-butadiene-isoprene rubber, natural rubber, or polyisoprene;

b. at least one non-polar solvent, wherein the non-polar solvent is selected from the group consisting of: alkanes having from 4 to 9 carbon atoms, cycloalkanes or alkyl cycloalkanes having from 5 to 10 carbon atoms, or aromatics and alkyl substituted aromatics having from 6 to 12 carbon atoms, and c. 5 to 100 phr of at least one thermoplastic resin, extended with a second non-polar solvent;

wherein the resin comprises at least one of: C5 resin, C9 resin, terpene resin, terpene-phenolic resin, rosin resin, cyclopentadiene resin, guayule resin, phenol novolak resin, phenol-formaldehyde resin, resorcinol-formaldehyde resin, reactive resol resin, reactive novolak type phenol-formaldehyde resin, or a combination thereof;

wherein the at least one conjugated diene monomer-containing rubber is produced by an anionic polymerization process that utilizes a randomizer.

12. The resin-extended rubber-solvent-cement of claim 11, wherein the second non-polar solvent is the same as the non-polar solvent.

13. The resin-extended rubber-solvent-cement of claim 11, wherein the second non-polar solvent is different from the non-polar solvent.

14. The resin-extended rubber-solvent-cement of claim 11, wherein the non-polar solvent and second non-polar solvent are exclusive of any solvent that will cause coagulation of the conjugated diene monomer-containing rubber.

15. The resin-extended rubber-solvent-cement of claim 11, wherein the second non-polar solvent is selected from the group consisting of: alkanes having from 4 to 9 carbon atoms, cycloalkanes or alkyl cycloalkanes having from 5 to 10 carbon atoms, or aromatics and alkyl substituted aromatics having from 6 to 12 carbon atoms.

16. The resin-extended rubber-solvent-cement of claim 11, wherein the resin comprises at least one of: terpene resin, terpene-phenolic resin, rosin resin, cyclopentadiene resin, guayule resin, phenol novolak resin, phenol-formaldehyde resin, resorcinol-formaldehyde resin, reactive resol resin, reactive novolak type phenol-formaldehyde resin, or a combination thereof.

17. The resin-extended rubber-solvent-cement of claim 11, wherein the at least one thermoplastic resin is guayule resin, a dicyclopentadiene resin, or both.

18. The resin-extended rubber-solvent-cement of claim 1, wherein the at least one thermoplastic resin is present in an amount of 80 to 100 phr.

19. The resin-extended rubber-solvent-cement of claim 1, wherein the at least one thermoplastic resin is extended with a second non-polar solvent.

20. The resin-extended rubber-solvent-cement of claim 11, wherein the resin-extended rubber-solvent-cement further comprises one or more antioxidants or terminators, and is essentially exclusive of other components.

* * * * *